(12) United States Patent
Davis

(10) Patent No.: US 10,221,959 B1
(45) Date of Patent: Mar. 5, 2019

(54) HIGHER SPEED LOWER TORQUE MAGNETIC VALVE ACTUATOR

(71) Applicant: Edward P. Davis, Kihei, HI (US)

(72) Inventor: Edward P. Davis, Kihei, HI (US)

(*) Notice: Subject to any disclaimer, the term of this patent is extended or adjusted under 35 U.S.C. 154(b) by 0 days.

(21) Appl. No.: 16/150,904

(22) Filed: Oct. 3, 2018

Related U.S. Application Data

(60) Provisional application No. 62/567,592, filed on Oct. 3, 2017.

(51) Int. Cl.
| | |
|---|---|
| *F16K 31/44* | (2006.01) |
| *F16K 31/10* | (2006.01) |
| *F16K 31/08* | (2006.01) |
| *F16K 31/53* | (2006.01) |
| *F16K 31/50* | (2006.01) |

(52) U.S. Cl.
CPC ........... *F16K 31/105* (2013.01); *F16K 31/08* (2013.01); *F16K 31/504* (2013.01); *F16K 31/535* (2013.01)

(58) Field of Classification Search
CPC .... F16K 31/0644; F16K 31/08; F16K 31/535; F16K 31/105; F16K 31/504
USPC .................................................... 251/65, 248
See application file for complete search history.

(56) References Cited

U.S. PATENT DOCUMENTS

| | | | | |
|---|---|---|---|---|
| 1,261,949 | A | * 4/1918 | Lucas | F16K 31/5284 251/115 |
| 1,734,419 | A | * 11/1929 | Chitty | H02P 7/03 137/552 |
| 2,025,244 | A | * 12/1935 | Morehead | F16K 31/535 137/246.14 |
| 2,184,513 | A | * 12/1939 | Clade | F16K 31/535 251/249.5 |
| 3,105,147 | A | * 9/1963 | Weilbach | G01N 21/37 250/252.1 |
| 3,877,677 | A | * 4/1975 | Daghe | F16K 1/221 251/228 |
| 3,908,959 | A | * 9/1975 | Fichtner | F16J 15/50 251/129.03 |
| 3,993,090 | A | | 11/1976 | Hankison |
| 4,178,816 | A | * 12/1979 | Radice | B25B 17/02 251/248 |
| 4,296,912 | A | | 10/1981 | Ruyak |
| 4,309,152 | A | | 1/1982 | Hagen |
| 4,671,486 | A | | 6/1987 | Giannini |
| 5,169,117 | A | | 12/1992 | Huang |
| 6,213,445 | B1 | | 4/2001 | Sato et al. |
| 6,853,160 | B1 | | 2/2005 | Gandel et al. |
| 7,013,917 | B2 | | 3/2006 | Joseph |
| 7,163,192 | B2 | | 1/2007 | Aoki et al. |
| 7,448,482 | B2 | | 11/2008 | Park |
| 7,487,829 | B2 | | 2/2009 | McDonald et al. |
| 7,523,917 | B2 | | 4/2009 | Arai |

(Continued)

*Primary Examiner* — Umashankar Venkatesan
(74) *Attorney, Agent, or Firm* — K&L Gates LLP

(57) ABSTRACT

Various devices and techniques related to magnetically-actuated valves are generally described. In some examples, magnetically-actuated valves may include mechanisms to provide mechanical advantage such that the torques or forces applied to the valve member are higher than the torques or forces transmitted across the sealed valve enclosure by the magnetic coupling. In some examples, valves may employ mechanisms coupled to the external actuator with inverse mechanical advantage that better match traditional or convenient actuation rates of other valves.

22 Claims, 13 Drawing Sheets

(56) References Cited

U.S. PATENT DOCUMENTS

| | | |
|---|---|---|
| 7,588,002 B2 | 9/2009 | Wygnanski et al. |
| 7,694,622 B2 | 4/2010 | Jeter et al. |
| 7,726,524 B2 | 6/2010 | Merabet et al. |
| 8,297,315 B2 | 10/2012 | Esveldt |
| 8,418,990 B2 | 4/2013 | Podstawka et al. |
| 8,424,838 B2 | 4/2013 | Dolenti et al. |
| 8,496,228 B2 | 7/2013 | Burgess et al. |
| 8,528,597 B2 | 9/2013 | Friedman et al. |
| 8,689,826 B2 | 4/2014 | Sulmone |
| 8,690,119 B2 | 4/2014 | Burgess et al. |
| 8,919,730 B2 | 12/2014 | Vick, Jr. |
| 9,133,950 B2 | 9/2015 | Gopalan et al. |
| 9,377,121 B2 * | 6/2016 | Burgess ................ F16K 31/041 |
| 9,624,753 B2 | 4/2017 | Stinessen et al. |
| 9,702,469 B2 * | 7/2017 | Burgess .................... F16K 3/02 |
| 2004/0007008 A1 | 1/2004 | Benatav |
| 2008/0073606 A1 | 3/2008 | Liantonio |
| 2008/0191155 A1 | 8/2008 | Scollay |
| 2011/0240893 A1 | 10/2011 | Windgassen |
| 2012/0085947 A1 | 4/2012 | Yamaguchi et al. |
| 2016/0102775 A1 | 4/2016 | Shakkour |

* cited by examiner

HIGHER SPEED LOWER TORQUE MAGNETIC VALVE ACTUATOR

CROSS-REFERENCE TO RELATED APPLICATIONS

This application claims the benefit of U.S. Provisional Application No. 62/567,592 filed Oct. 3, 2017, the disclosure of which is incorporated herein by reference in its entirety.

FIELD

This application relates to valve technology and, more specifically, to valve actuator mechanisms.

BACKGROUND

Valves often develop leaks as they age. Leaking valves can be annoying, wasteful, and can cause damage in residential settings, but can be far more problematic in industrial applications. Factory lines may need to be shut down to repack or replace valves, resulting in lost production and unnecessary downtime. Leaks can cause environmental damage and safety issues. Steam leaks can scald and even kill workers. The Environmental Protection Agency (EPA) is concerned about pollution resulting from leaky valve stem seals in factories and oil fields. In extreme cases, such as semiconductor manufacturing, even microscopic leaks can be fatal—breathing tanks and hazmat suits are often required to clean up after leaks are detected in semiconductor foundries.

Most traditional valves have two moving seals: (1) the Seat where the flow of material through the valve is allowed, controlled, and shut off, and (2) the Stem seal that keeps the material from leaking out of the hole for the valve handle. Studies have shown that up to 80 percent of the leaks encountered in real world valves are associated with the stem seals because they tend to entrain dirt and grit which can erode the mating surfaces over time.

Traditional valves contain stem seals that often degrade or leak over time. Previous seal-less valves often employed bending or flexing components such as bellows or membranes that can degrade or fatigue and also leak long term. Additionally, previous generations of magnetic valves usually contained internal magnets and/or operated in a linear solenoid type manner making high temperature operation difficult to achieve, and often requiring continuous power to maintain their position.

SUMMARY

Systems and methods are provided for magnet-actuated valves that employ higher speed and lower force (e.g., lower torque) across a magnetic coupling, while still preserving the forces necessary for the valve member to control flow through the valve, and/or preserve the essential character of the external actuation mechanisms, whether manually or automatically actuated.

In accordance with various embodiments of the present invention, a valve assembly is generally described. In some examples, the valve assembly may comprise a valve body defining an enclosure. In some other examples, the valve assembly may further comprise a stem disposed in the enclosure. In various other examples, the valve assembly may further comprise a movable valve actuator component disposed in the enclosure and operatively coupled to a first end of the stem. In some examples, the valve assembly may further comprise an internal actuation member having a ferromagnetic portion. In other examples, the internal actuator may contain magnets. In various examples, the internal actuation member may be operatively coupled to a second end of the stem. In some other examples, the valve assembly may further comprise an external actuator operatively coupled to an exterior of the valve body. In some examples, the external actuator may comprise a first magnetic pole section adjacent to the valve body. In some other examples, the external actuator may comprise a second magnetic pole section adjacent to the valve body. In some examples, magnetically-actuated valves may include mechanisms to provide mechanical advantage such that the forces (e.g., linear forces and/or torques) applied to the valve member are higher than the forces transmitted across the sealed valve enclosure by the magnetic coupling between magnets of the external actuator and the ferromagnetic internal actuation member. Some embodiments may also employ mechanisms coupled to the external actuator with inverse mechanical advantage (e.g., a speed ratio greater than one) such that the forces transmitted across the magnetic coupling are less than the forces applied at an external actuator or handle. The various mechanisms providing mechanical advantage and/or inverse mechanical advantage may be used in order to better match traditional or convenient actuation rates of the valve. In various examples, the forces and torques transmitted to and by the various mechanisms (e.g., gears, levers, and other mechanisms providing mechanical advantage or inverse mechanical advantage) may be transmitted through and/or by one or more intervening components, such as other mechanisms and/or valve components. For example, an internal gear mechanism may transmit a torque to a movable valve member through one or more intervening mechanisms, such as one or more second gear mechanisms, a threaded valve stem, etc.

It may be advantageous to slowly rotate a traditional valve stem that protrudes through a valve packing in order to minimize frictional losses and to prolong reliable service life of such valves. However, a continuous mechanical valve stem can support fairly high torques per unit of cross-sectional area. When employing a magnetic coupling as an actuation mechanism, large magnets may be used to generate high forces (e.g., high torques) during actuation. However, such large magnets may be expensive and/or bulky. Accordingly, in some examples, it may be advantageous to use smaller magnets and to rotate the magnetic coupling quickly. Although the smaller magnets may generate less torque relative to a larger magnet, the speed of actuation may be increased as described herein to open and close the valve at a rate equivalent to a magnetic valve using larger magnets. Additionally, in various examples described herein, magnets may be disposed outside the sealed valve enclosure, without any internal permanent magnets. Such a valve architecture may use an impermanent magnetic material (e.g., a ferromagnetic material) as an internal actuation component. Such a magnetic valve actuation architecture may allow higher temperature operation of the valve without risk of demagnetization of any internal magnetic components due to heat. Additionally, such valves may be welded, soldered, and/or brazed to provide hermetic sealing, as any external magnets used to actuate such valves may be decoupled from the valve prior to welding, soldering, and/or brazing. Various mechanisms, as described in further detail below, may be used to actuate such magnetic actuators more quickly such that an equivalent power is transmitted to the valve member relative to a magnetic actuator using larger, more powerful magnets.

Accordingly, in various examples, the magnetically-actuated valves and actuators described herein may offer increased actuation performance, reduced size, and reduced cost relative to traditional mechanical and magnetic valve assemblies. Additionally, the valves and actuators described herein provide equivalent work on internal valve members as larger, more expensive magnetic couplings.

In various examples, the various valves and/or actuators described herein may increase rotational speed of a magnetic coupling in order to perform increased work on an internal valve actuator for a given size, cost, and torque transmission capability of a magnetic coupling. As used herein the term "force" includes rotational force such as torque.

A tradeoff exists between torque, actuation speed, and phenomena known as ohmic damping when transmitting rotation or any movement across a conductive enclosure using a magnetic coupling. In general, the faster the magnetic coupling moves (e.g., rotates), the more electrical current is induced in the conductive housing, increasing ohmic losses. Ohmic losses manifest as heating of the conductive enclosure. Accordingly, for valves that actuate very quickly and/or often, valve design may be optimized to reduce ohmic losses. For example, magnet size and/or strength may be increased to allow for slower actuation at increased torque to reduce valve heating due to ohmic losses. In some other examples, an electrically non-conductive bonnet (e.g., a composite bonnet using carbon fiber) may be used to eliminate ohmic losses.

The valve assembly may further comprise a valve body defining an enclosure, wherein the internal actuator is disposed in the enclosure; and an external actuator coupled to an exterior of the valve body, the external actuator comprising a first magnetic pole section and a second magnetic pole section adjacent to the valve body; wherein, when the first actuator component is aligned with the second actuator component at the first angular displacement, the first magnetic pole section is magnetically coupled to the first actuator component and the second magnetic pole section is magnetically coupled to the free end of the second actuator component, and rotation of the external actuator in the first direction effectuates rotation of the internal actuator in the first direction.

In various embodiments, the internal actuator comprises a ferromagnetic material, a permanent magnet, or an impermanently magnetic material. In some embodiments, the valve assembly further comprises a valve member effective to open and close a fluid flow path of the valve assembly; and a valve stem operatively coupled to the internal actuator and to the valve member.

Other approaches, such as employing extremely large magnets to achieve higher torques are expensive, large, potentially have safety implications, and/or are limited in the amount of torque that they can handle. Previous rotary magnetic couplings for valve actuators relied on ever larger magnets, more powerful grades of magnets, and/or internal magnets in order to achieve the necessary torque-handling capability for the valve. Various embodiments described herein offer improvements in magnetic couplings for valve actuators. For example, in some embodiments, the magnetic couplings described herein may employ a lower torque magnetic coupling operated at higher speed in conjunction with increasing and decreasing torque ratio components (e.g., gears and/or levers). In some examples, geared magnetic valve actuators may include gears only inside the internal portion of the magnetic coupling, and may be tedious to operate manually and/or may be incompatible with existing automated actuation mechanisms that rely on a different legacy number of turns or rotation rate to actuate.

Systems including many powerful high-grade magnets may be cost prohibitive for many applications, and may not offer competitive performance relative to mechanical valves. Additionally, large valve actuators (e.g., actuators including large, powerful magnets) may not fit in legacy applications, and may not be appealing for new designs due to the space they consume. Torque limitations may preclude certain types of valves, or limit the pressures or other conditions that the valves can be used in.

In various embodiments described herein, magnetic couplings for valve actuators are described that offer a smaller magnetic coupling that is both cheaper and smaller relative to larger magnetic valve actuators. However, the magnetic couplings for valve actuators described herein are effective to perform equivalent work to these larger, magnetic valve actuators even while offering smaller form factors and less expensive components (e.g., less expensive magnetic materials).

DETAILED DESCRIPTION

In the following description, reference is made to the accompanying drawings that illustrate several embodiments of the present disclosure. Still other embodiments of the present disclosure will become readily apparent to those skilled in the art from the following detailed description, which describes embodiments illustrating various examples of the invention. As will be realized, the invention is capable of other and different embodiments and its several details are capable of modifications in various respects, all without departing from the present disclosure. Accordingly, the drawings and detailed description are to be regarded as illustrative in nature and not as restrictive. It is to be understood that drawings are not necessarily drawn to scale.

Various embodiments of the present disclosure provide improved systems and methods for actuating magnetic valves using one or more torque or actuation force enhancing mechanisms as described herein. These embodiments may provide improved performance and overcome various technical challenges presented when using conventional magnetic valves.

Figure 1:
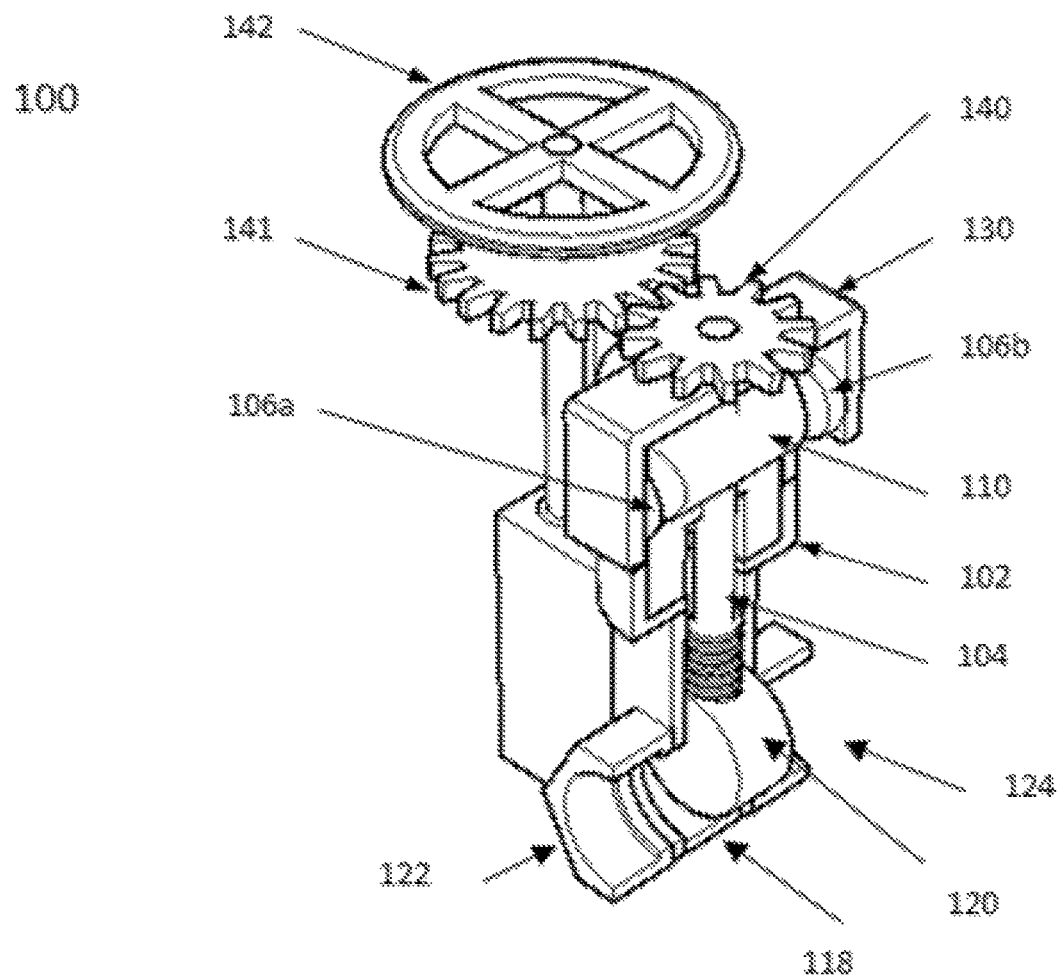
FIG. 1 depicts an assembled isometric cut-away view of a ferromagnetic magnet-actuated gate valve including an external gear mechanism, in accordance with various aspects of the present disclosure.

FIG. 1 depicts an assembled isometric cut-away view of a ferromagnetic magnet-actuated gate valve including an external gear mechanism, in accordance with various aspects of the present disclosure.

Valve assembly 100 includes a body 102. Body 102 may be the outer casing of valve assembly 100 and may comprise any desired material depending on the desired application for the particular valve assembly 100. In various examples, body 102 may comprise various metallic materials such as brass, copper, steel, bronze, gunmetal, alloy steels, non-400 series stainless steels, iron or the like. In some examples, body 102, or portions of body 102, may comprise a metal that has a low magnetic permeability. In some examples, the portion of body 102 adjacent to internal actuation member 110 may comprise a metal that has a low magnetic permeability. For example, the metal may comprise aluminum, copper, titanium, and alloys thereof, and may exhibit a relative magnetic permeability (e.g., the ratio of magnetic permeability of a material vs. the magnetic permeability of free space) less than 10. In some embodiments the metal may exhibit a relative magnetic permeability of about 1. In still other examples, body 102 may comprise one or more plastics and/or composite materials. Different materials may be selected for body 102 depending on the desired application for the valve assembly 100. For example, materials may be selected for body 102 of valve assembly 100 which are resistant to corrosion, heat, moisture, rust, and/or bacterial growth.

Figure 4A:
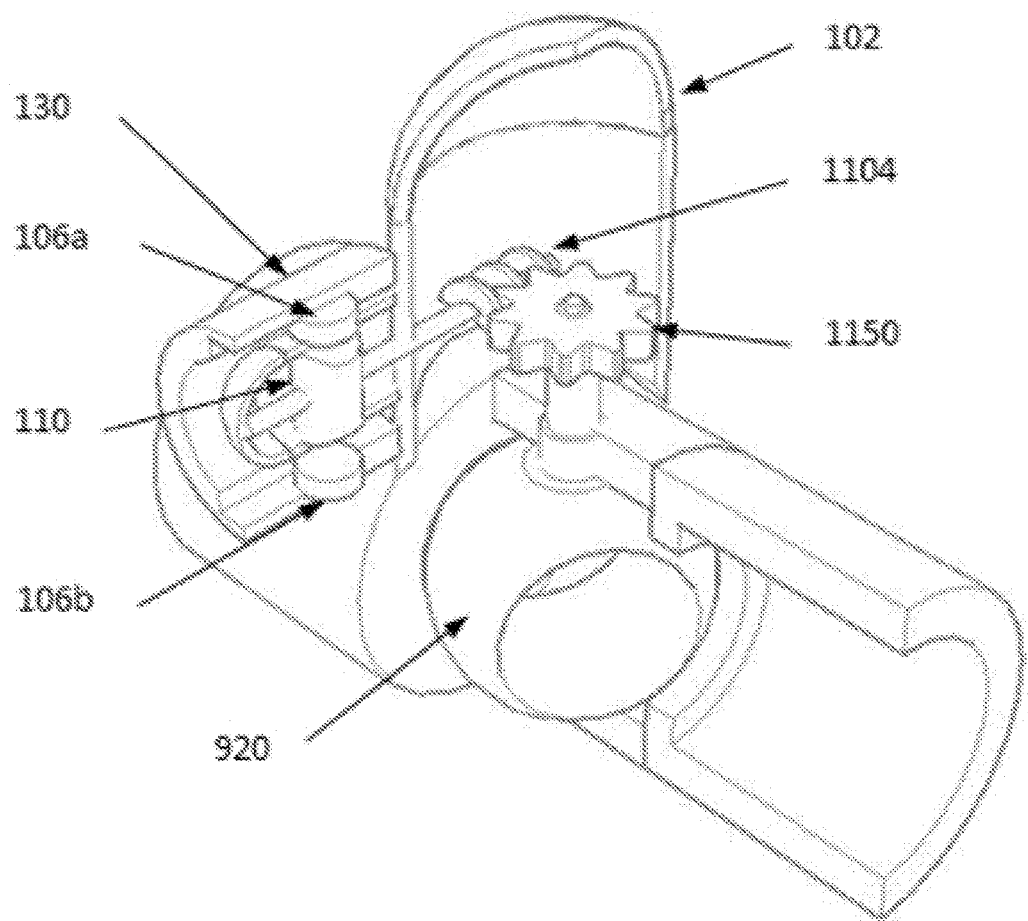
FIG. 4A depicts an assembled isometric cut-away view of a ferromagnetic magnet-actuated ball valve including an internal worm gear mechanism, in accordance with various aspects of the present disclosure.
Figure 4B:
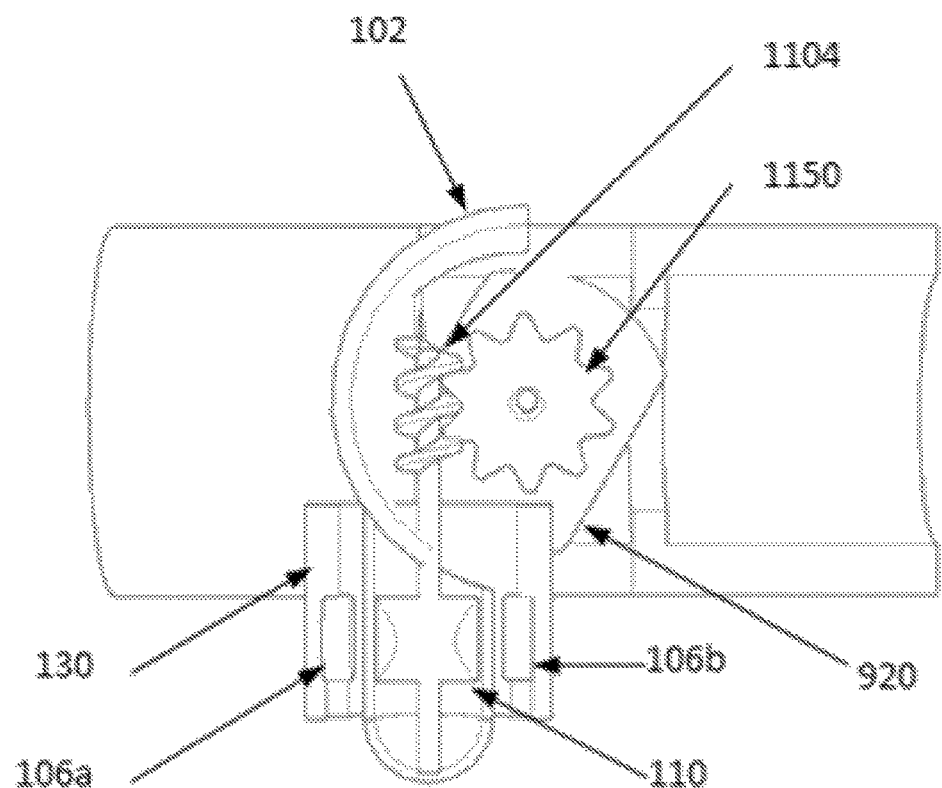
FIG. 4B depicts an assembled top view (along the axis of rotation) of a ferromagnetic magnet-actuated ball valve including an internal worm gear mechanism, in accordance with various aspects of the present disclosure.

Valve assembly 100 may include a stem 104. Stem 104 may transmit motion from a handle, actuator, and/or other controlling device to a movable valve member 120. For example, in a ball valve (e.g., a valve in which valve member 120 is a ball, as depicted in FIGS. 4A, 4B), stem 104 may be operatively coupled to the ball such that rotating the stem 104 using a handle or other actuator of the valve may, in turn, rotate the ball between an open position and a closed position to control a flow of fluid through the valve. Various types of valves along with their corresponding actuation mechanisms and valve members (sometimes referred to as "discs") may be used in accordance with embodiments of the present disclosure. In a few examples, gate valves, ball valves, globe valves, butterfly valves, plug valves, poppet valves, needle valves, and/or spool valves may be used in accordance with embodiments of the present disclosure depending on the desired valve type.

External magnets 106a, 106b may be disposed on a first portion of the annular base portion of external actuator 130. A first magnetic pole section of external magnet 106a may be disposed adjacent to a first location of the base portion of external actuator 130. Similarly, a second magnetic pole section (the north pole of external magnet 106b) of external magnet 106b may be disposed adjacent to a second location of the annular base portion of external actuator 130.

Internal actuation member 110 may be mechanically coupled to stem 104. Accordingly, rotation of internal actuation member 110 may rotate stem 104, which may, in turn, actuate movement of valve member 120 between an open position and a closed position in seat 118. As depicted in FIG. 1, internal actuation member 110 may be enclosed within valve body 102 such that internal actuation member 110 is not exposed to the exterior of body 102 of valve assembly 100. Valve body 102 may define an enclosure. In various examples, internal actuation member 110, stem 104, and/or valve member 120 may be disposed within the enclosure. Internal actuation member 110 may comprise a material having a high magnetic permeability such that magnetic flux flows from an external magnet (such as, for example, external magnets 106a, 106b) through internal actuation member 110 and returns to either the same external magnet or a different external magnet. In some examples, internal actuation member 110 may comprise one or more ferromagnetic materials such as iron, nickel, cobalt and/or alloys thereof. In another example, internal actuation member 110 may comprise 400 series stainless steel. Although internal actuation member 110 may comprise one or more materials having high magnetic permeability, in various examples, ferromagnetic actuation member may not be a permanent magnet and may not necessarily include permanent magnets. Internal actuation member 110 and/or materials of internal actuation member 110 may be temporarily magnetized while internal actuation member 110 is exposed to magnetic fields of magnetic pole sections of external magnets 106a, 106b.

In some examples, internal actuation member 110 may be non-radially symmetric. For example, internal actuation member 110 may comprise an elongate member with a first end aligned with a first magnetic pole section of external magnet 106a and a second end aligned with a second magnetic pole section of external magnet 106b, in a preferred orientation. Additionally, in some examples, internal actuation member 110 may comprise a material of high magnetic permeability, such as iron or 400 series stainless steel, embedded within a material of low magnetic permeability, such as ceramic. In some examples, the embedded material may form a path within the ceramic material such that magnetic flux flows along the path when a magnetic field interacts with internal actuation member 110.

In some examples, external actuator 130 may comprise a handle, level, or other actuation mechanism effective to rotate external magnets 106a, 106b around body 102. In various examples, motors may be used to turn the handle and/or control actuation of external actuator 130. Generally, when the handle is not being turned or otherwise actuated, the internal actuation member 110 maintains its current position and thus the valve member 120 remains in its current state. Although external actuator 130 is depicted in FIG. 1 as being above the valve body 102, in some examples, external actuator 130 may be in-plane with external magnets 106a, 106b or underneath external magnets 106a, 106b. In some examples, external actuator 130 may comprise a ferromagnetic material to form a return flow path for magnetic flux flowing from external magnet 106a, through internal actuation member 110, to magnet 106b, and through ferromagnetic external actuator 130 to return to external magnet 106a. It should be appreciated that in various other examples, magnetic flux may flow from external magnet 106b, through internal actuation member 110, to magnet 106a, and through ferromagnetic external actuator 130 to return to external magnet 106b.

Magnetic flux from external magnets 106a, 106b may be effective to orient internal actuation member 110 in a preferred orientation with respect to the magnetic pole sections of external magnets 106a, 106b.

In still other examples described in further detail below, external magnet 106a may include a north pole section and south pole section. In such an example, magnetic flux may flow from the north pole section of external magnet 106a, through a flux path in internal actuation member 110, and return from internal actuation member 110 to the south pole section of external magnet 106a. Similarly, in another example, external magnet 106b may include a north pole section and south pole section. In such an example, magnetic flux may flow from the north pole section of external magnet 106b, through a flux path in internal actuation member 110, and return from internal actuation member 110 to the south pole section of external magnet 106b.

External magnets 106a and 106b may comprise, for example, permanent magnets such as Neodymium Iron Boron magnets, Samarium Cobalt magnets, Alnico magnets, Ceramic and/or Ferrite magnets. Examples of different Neodymium magnets may include N42, N52, and N42SH grade Neodymium magnets. Different magnets may exhibit different magnetic field strengths (in terms of Gauss and/or Teslas) and different pull forces. As such, different magnets may produce different amounts of torque in internal actuation member 110 when the magnets are rotated around body 102 of valve assembly 100. In some examples, external magnets 106a and/or 106b may comprise combinations of different permanent magnets. Additionally, in some examples, external magnets 106a and/or 106b may comprise electromagnets. In an example, a typical Neodymium N42 magnet might have dimensions of 1"×2"×½". In order to double the torque, the size of the magnet should be quadrupled, as magnetic force does not increase linearly with magnet size. Accordingly, previous attempts at increasing magnetic valve torque may require large and expensive magnets. However, various approaches described herein use external and internal mechanisms to increase and decrease torque according to the desired application. Such valve architectures may have smaller form factors and may be less expensive relative to magnetically-actuated valves that employ large magnets, while retaining equivalent performance in terms of seating force.

External magnets 106a and/or 106b may exhibit different Curie temperatures depending on the particular types of magnets used. A Curie temperature is the temperature at or above which a magnet becomes demagnetized. After the temperature of a magnet drops below the Curie temperature, the magnet may no longer behave as it did prior to reaching the Curie temperature, or temperatures above the Curie temperature. In the examples described in the present disclosure, magnets are included in the external portions of the various valves, but may not be included within body 102. Such a configuration may be advantageous if the valves are welded, soldered, and/or brazed during installation and/or repair. If the valves are to be subjected to temperatures above the Curie temperature for the particular external magnets, the external magnets may be removed prior to heating the valve in order to avoid demagnetizing the external magnets. The external magnets may thereafter be reattached after the valve has returned to the rated operating temperature range for the particular external magnets used with the valve. The valve may thereafter be actuated using the various techniques described in the present disclosure. In some examples, body 102 of valve assembly 100 and/or the external magnets 106a, 106b may be heat-shielded using insulating materials to prevent hot material passing through the valves (e.g., steam or other hot liquids) from demagnetizing the external magnets 106a, 106b. In some other examples, valves in accordance with the present disclosure may include one or more heat sinks (such as radiators and/or fins) to dissipate heat caused by hot material passing through the valves in order to prevent demagnetization of external magnets 106a, 106b.

Because internal actuation member 110 is not a permanent magnet, internal actuation member 110 may be heated without losing its ferromagnetic properties. Additionally, by sealing stem 104 within body 102 of valve assembly 100, a stem seal is avoided. A stem seal is an interface through which a stem passes between the interior of a valve and the exterior of the valve. Dirt and/or other contaminants can be introduced at the stem seal and can cause a leak in the stem seal. As such, for many applications it may be advantageous to seal the stem within the body of the valve assembly 100, as described herein.

Valve assembly 100 may include ports 122 and 124. Although in the example depicted in FIG. 1, two ports are shown, more ports may be used depending on the particular valve. Ports 122 and 124 may be inlet and/or outlet ports. Additionally, in some examples, ports 122 and 124 may be interchangeable as inlet ports and outlet ports depending on the way valve assembly 100 is installed in a system.

Actuator 142 (which may be a handle or other component that may be used to rotate gear 141) may be coupled to and effective to rotate gear 141. In turn, gear 141 may interface with gear 140. Gear 140 may be coupled to external actuator 130 and hence external magnets 106a and 106b. The configuration of gears 141, 140 may be effective to rotate external magnets 106a and 106b at a higher speed relative to a speed of rotation of actuator 142. For example, rotating actuator 142 at a first rotational velocity may be effective to rotate external actuator 130 at a speed that is higher than the first rotational velocity due to gearing ratios of gears 141, 140. The gearing mechanism (e.g., gears 140, 141) depicted in FIG. 1 may be described as an external gearing mechanism as gears 140, 141 are disposed outside of body 102 of valve assembly 100. This external gearing mechanism may be used to achieve higher rotation speeds and lower torque (e.g., lower torque on internal actuation member 110) than the valve would otherwise exhibit by manually rotating external actuator 130 without gears 140, 141. In various examples, the threaded portion of stem 104 may have a finer pitch (e.g., the distance between threads may be smaller) relative to a legacy gate valve. Valve assembly 100 including gears 140, 141 may require more rotations of the magnetic actuator for a given amount of gate travel relative to a legacy gate valve, but may generate an equivalent amount of work, where work W is defined as W=torque*angle of rotation (in radians).

In at least some examples, the helical orientation of the threads on stem 104 may be oriented so that actuator 142 may be rotated in a clockwise direction to close the valve and in a counterclockwise direction to open the valve. Although, such directions of actuation are typical in many valves, the direction of rotation used to close and open the valve can be selected according to the desired implementation.

Figure 2:
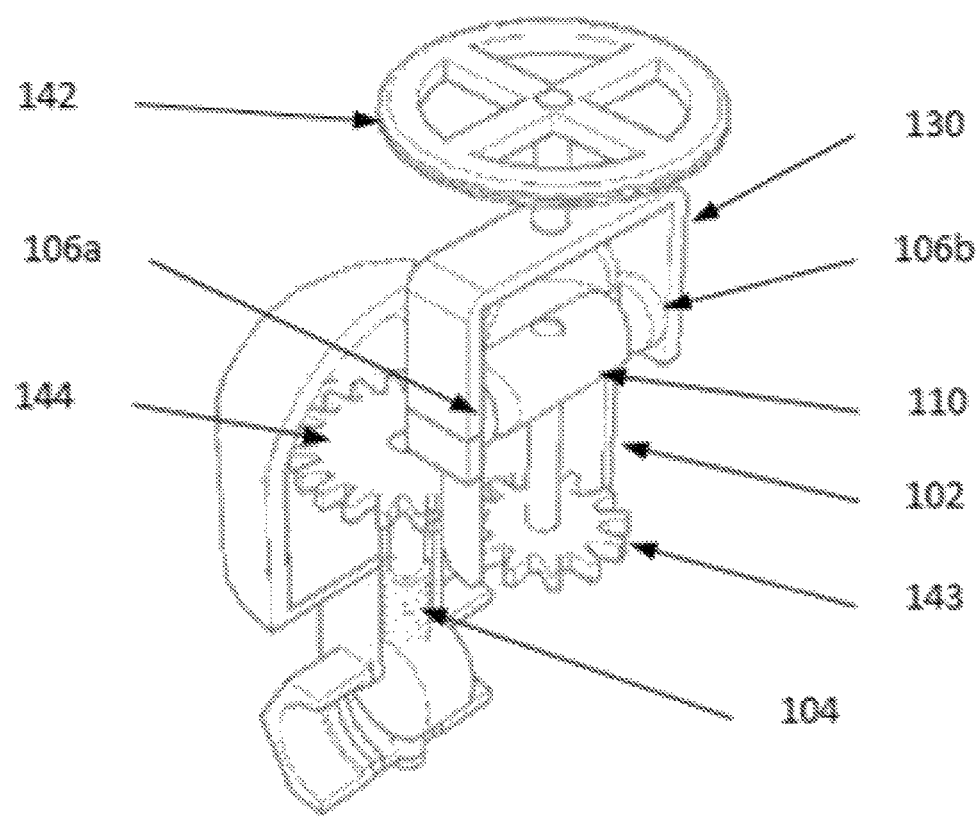
FIG. 2 depicts an assembled isometric cut-away view of a ferromagnetic magnet-actuated gate valve including an internal gear mechanism, in accordance with various aspects of the present disclosure.

FIG. 2 depicts an assembled isometric cut-away view of a ferromagnetic magnet-actuated gate valve including an internal gear mechanism geared down to allow higher rotation speeds and lower torque at the magnetic actuator, and to produce higher torque and forces on the threaded portion of stem 104 than the valve would otherwise exhibit without the internal gear mechanism. Those components in FIG. 2 that have been described previously with reference to FIG. 1 may not be described again for purposes of clarity and brevity. Rotation of actuator 142 causes rotation of external actuator 130 which, in turn, causes rotation of internal actuation member 110. Rotation of internal actuation member 110 causes rotation of gear 143. Gear 143 interfaces with and causes rotation of gear 144 when gear 143 is rotated. Gear 144 is coupled to stem 104. Accordingly, rotation of gear 144 causes rotation of stem 104 (e.g., an at least partially threaded lead screw). Gear 144 being larger than gear 143 causes stem 104 to rotate more slowly, and with higher torque, relative to rotation of external magnets 106a, 106b and external actuator 130 during actuation of the valve. For example, the magnetic coupling between external actuator 130 and internal actuation member 110, for a 2 inch valve, may generate approximately 3.5 ft lbs of torque. However, the gear ratio (e.g., the diameter ratio) between gear 143 and gear 144 may be adjusted to provide mechanical advantage. For example, gear 144 may be twice as large as gear 143 and may therefore generate twice the torque according to the mechanical advantage formula $T_2=T_1(L_2/L_1)$ where $T_2$ is the resultant torque (e.g., on gear 144), $T_1$ is the applied torque (e.g., on gear 143), $L_2/L_1$ is the ratio of gear diameters (e.g., gear 144 diameter/gear 143 diameter). Accordingly, in the example, if gear 144 is twice the diameter of gear 143, the internal mechanism may generate 2*3.5 ft lbs=7 ft lbs of torque.

The internal gear mechanism depicted in FIG. 2 and comprising gears 143 and 144 may achieve higher torque (and lower rotation speeds) than would otherwise be achieved without the internal gear mechanism. However, the valve depicted in FIG. 2 may require more rotations of internal actuation member 110 for a given amount of gate travel relative to an equivalent magnetic valve without the internal gear mechanism.

As described above in reference to FIG. 1, in at least some examples, the helical orientation of the threads on stem 104 may be oriented so that actuator 142 may be rotated in a clockwise direction to close the valve and in a counterclockwise direction to open the valve. Although, such directions of actuation are typical in many valves, the direction of rotation used to close and open the valve can be selected according to the desired implementation by changing the orientations of the threaded portion of stem 104 and/or by adding additional gearing.

Figure 3:
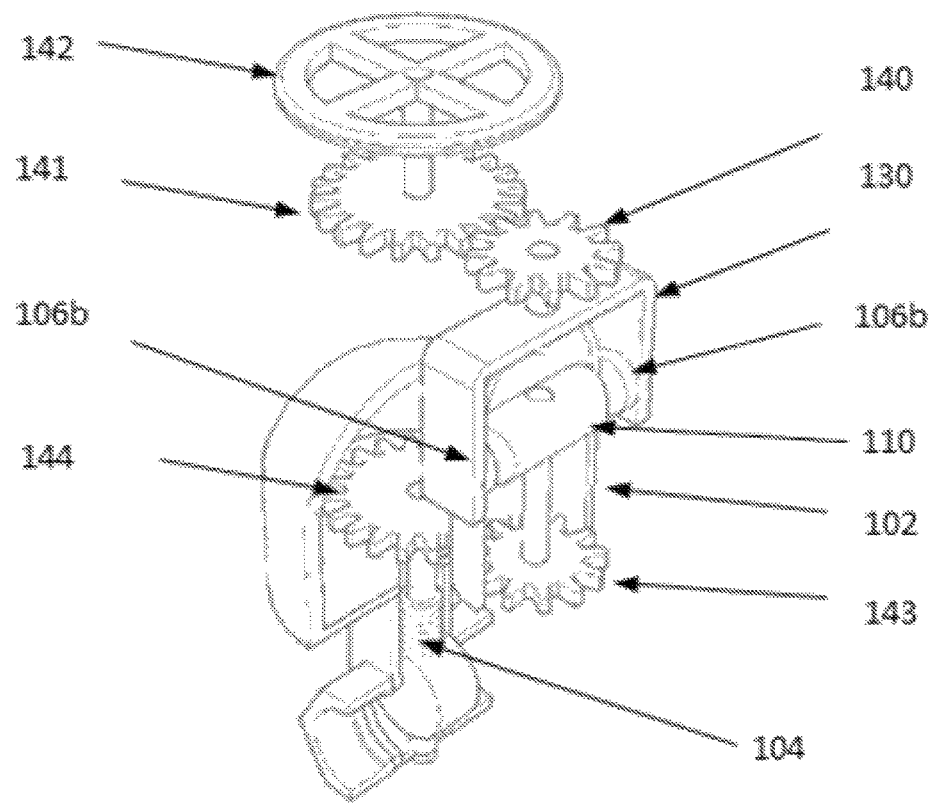
FIG. 3 depicts an assembled isometric cut-away view of a ferromagnetic magnet-actuated gate valve including internal and external gear mechanisms, in accordance with some aspects of the present disclosure.

FIG. 3 depicts an assembled isometric cut-away view of a ferromagnetic magnet-actuated gate valve including internal and external gear mechanisms, in accordance with some aspects of the present disclosure. Those components in FIG. 3 that have been described previously with reference to FIGS. 1 and 2 may not be described again for purposes of clarity and brevity.

Rotation of actuator 142 causes rotation of gear 141. Gear 141 interfaces with gear 140 and causes rotation of gear 140 when gear 141 is rotated. Gear 140 is coupled to external actuator 130 and thus rotation of gear 140 causes rotation of external actuator 130 including external magnets 106a, 106b. The external gear mechanism (e.g., gears 140, 141 depicted in FIG. 3) may cause external actuator 130 to rotate more quickly relative to rotation of actuator 142. Accordingly, the external gear mechanism depicted in FIG. 3 may be used to achieve higher rotation speeds and lower torque than an equivalent valve would exhibit without the external gear mechanism. Inside, rotation of internal actuation member 110 causes gear 143 to rotate. Gear 143 may interface with gear 144. Rotation of gear 143 may cause rotation of gear 144. Gear 144 may be coupled to stem 104. Thus rotation of gear 144 may cause the stem 104 to rotate which, in turn, causes the valve member to rotate between an open and closed position. The internal gear mechanism comprising gears 143 and 144 causes stem 104 to rotate more slowly than external magnets 106a and 106b rotate. The internal gear mechanism achieves higher torque and lower rotation speed relative to an equivalent valve without the internal gear mechanism. However, the internal gear mechanism results in an increased number of rotations of the magnetic actuator for a given amount of valve member travel. Accordingly, if the mechanical advantage (e.g., the in torque) of the internal mechanism is matched to the inverse mechanical advantage of the external mechanism, the valve may behave in the same way as a legacy valve that does not include a magnetic coupling, while still transmitting an equivalent seating force to the valve member. In various examples, the mechanical advantage of the internal mechanism may be matched to the inverse mechanical advantage of the external mechanism to within a tolerance (e.g., 20%, 25%, or some other suitable value for the desired implementation and/or manufacture) in order to provide an equivalent actuation feel to that of a traditional mechanical valve. In other words, the difference between the input force of the external mechanism and the output force of the external mechanism may be selected to approximately match the difference between the input force of the internal mechanism and the output force of the internal mechanism.

FIG. 4A depicts an assembled isometric cut-away view of a ferromagnetic magnet-actuated ball valve including an internal worm gear mechanism, in accordance with various aspects of the present disclosure. Those components in FIG. 4A that have been described previously with reference to FIGS. 1-3 may not be described again for purposes of clarity and brevity.

Various valve types, such as ball valves and/or butterfly valves, may require higher torque to actuate relative to other types of valves, such as gate valves. In some examples, a worm gear mechanism may be used to impart higher torque to actuation. As depicted in FIG. 4A, an actuation mechanism of a valve may include a stem 1104 with a helical ridge (sometimes referred to as a "worm") effective to turn a worm gear 1150. The worm gear 1150 may produce an increased torque when rotated relative to rotation of stem 1104 alone. In the ball valve depicted in FIG. 4A, the worm gear is part of an internal gear mechanism within body 102 of the ball valve. Turning worm gear 1150 may actuate the valve member 920 between an open and a closed position.

FIG. 4B depicts an assembled top view (along the axis of rotation) of the ferromagnetic magnet-actuated ball valve of FIG. 4A. Those components in FIG. 4B that have been described previously with reference to FIGS. 1-4A may not be described again for purposes of clarity and brevity. The valve of FIG. 4B is internally geared down by a worm and worm gear to allow higher rotation speeds and lower torque at the magnetic actuator (e.g., the magnetic coupling between external actuator 130 and internal actuation member 110) while increasing the torque using the worm gear mechanism to produce an increased torque to rotate the ball valve member.

Figure 5A:
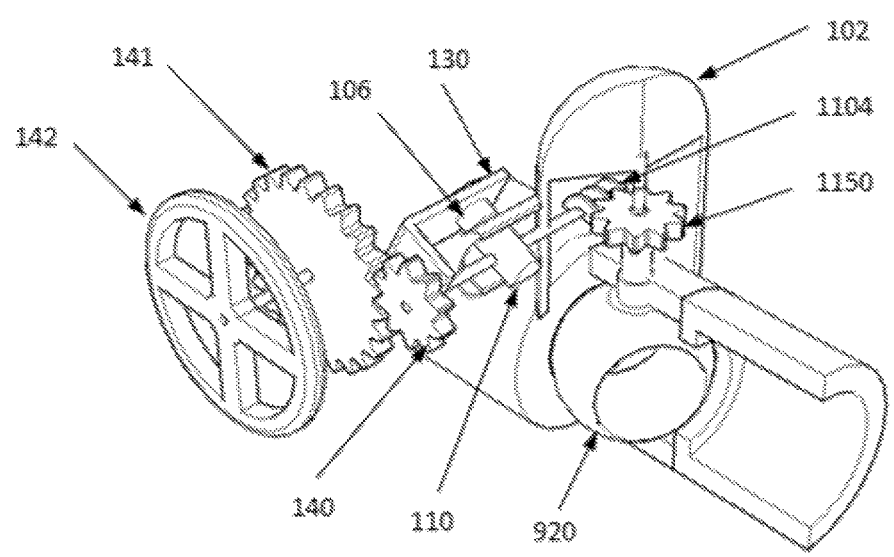
FIG. 5A depicts an assembled isometric cut-away view of a ferromagnetic magnet-actuated ball valve including external and internal gear mechanisms, in accordance with various aspects of the present disclosure.

FIG. 5A depicts an assembled isometric cut-away view of a ferromagnetic magnet-actuated ball valve including external and internal gear mechanisms, in accordance with various aspects of the present disclosure. Those components in FIG. 5A that have been described previously with reference to FIGS. 1-4B may not be described again for purposes of clarity and brevity.

Rotation of actuator 142 causes rotation of gear 141. Gear 141 interfaces with gear 140 and causes rotation of gear 140 when gear 141 is rotated. Gear 140 is coupled to external actuator 130 and thus rotations of gear 140 causes rotation of external actuator 130 including external magnets 106a, 106b. The external gear mechanism (e.g., gears 140, 141 depicted in FIG. 5A) may cause external actuator 130 to rotate at a higher rotational velocity relative to the rotational velocity of actuator 142. Accordingly, the external gear mechanism depicted in FIG. 5A may be used to achieve higher rotation speeds and lower torque than an equivalent valve would exhibit without the external gear mechanism. Inside, rotation of internal actuation member 110 causes stem 1104 to rotate which, in turn, causes worm gear 1150 to rotate at a higher torque and lower rotation speed relative to an equivalent valve without the internal worm gear (e.g., a valve where internal actuation member is directly coupled via a valve stem to the valve member 920). Although the internal gear mechanism results in an increased number of rotations of the magnetic actuator for a given amount of valve member rotation and/or travel, the external gear mechanism depicted in FIG. 5A may compensate for the increased number of rotations by achieving a higher actuation speed of the internal actuation member 110.

As described above, in at least some examples, the helical orientation of the threads on stem 1104 (e.g., the worm) may be oriented so that actuator 142 may be rotated in a clockwise direction to close the valve and in a counterclockwise direction to open the valve. Although, such directions of actuation are typical in many valves, the direction of rotation used to close and open the valve can be selected according to the desired implementation by changing the orientations of the threaded portion of stem 1104 and/or by adding additional gearing.

Figure 5B:
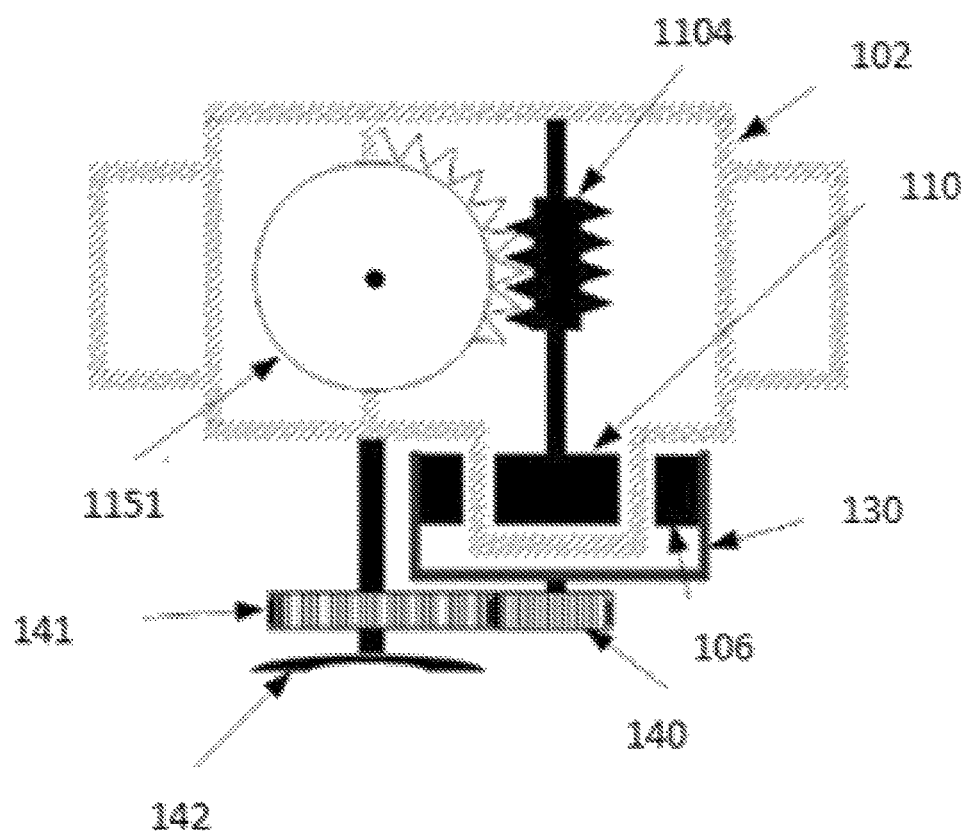
FIG. 5B depicts an assembled top view (along the axis of rotation) of a ferromagnetic magnet-actuated ball valve including external and internal gear mechanisms, in accordance with various aspects of the present disclosure.

FIG. 5B depicts an assembled top view (along the axis of rotation) of a ferromagnetic magnet-actuated ball valve including external and internal gear mechanisms, in accordance with various aspects of the present disclosure. Those components in FIG. 5B that have been described previously with reference to FIGS. 1-5A may not be described again for purposes of clarity and brevity.

The valve in FIG. 5B includes internal and external gear mechanisms similar to the valve depicted in FIG. 5A. The external gear mechanism depicted in FIG. 5B comprises gears 140 and 141, similar to the valve depicted in FIG. 5A. The valve in FIG. 5B comprises an internal gear mechanism comprising a wormed stem 1104 and a partial worm gear 1151 to allow higher rotation speeds and lower torque at the magnetic coupling between external actuator 130 and internal actuation member 110. The external gear mechanism of FIG. 5B causes external actuator 130 to rotate faster relative to rotation of actuator 142 and to generate lower torque at the magnetic coupling relative to an equivalent valve without the external gear mechanism. The internal gear mechanism may be effective to increase the amount of torque to rotate the ball valve member than the valve would exhibit if the ball valve were directly coupled to internal actuation member 110 without the internal gear mechanism (e.g., the worm gear mechanism) of FIG. 5B. Additionally, the external gear mechanism reduces the number of rotations of actuator 142 required to actuate the valve. The quarter worm gear 1151 serves to limit the ball travel to one quarter turn during actuation.

Figure 6A:
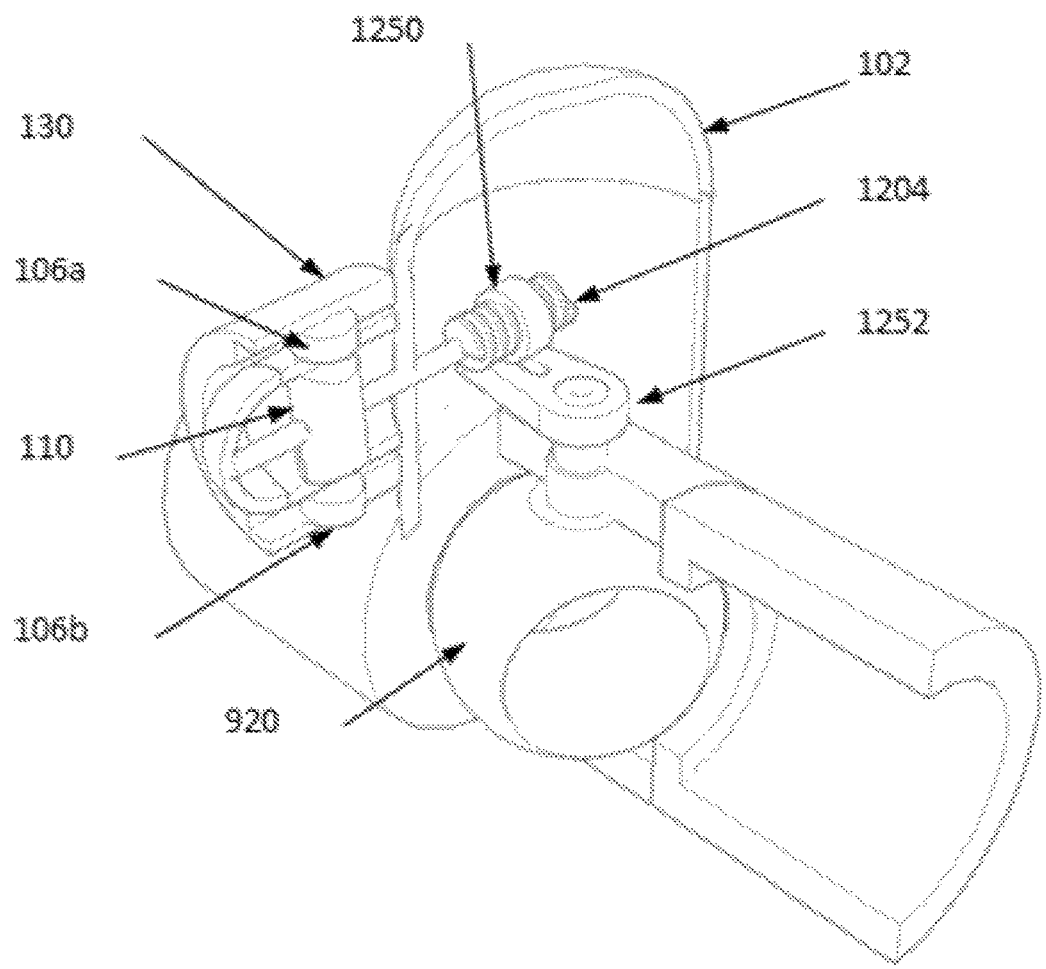
FIG. 6A depicts an assembled isometric cut-away view of a ferromagnetic magnet-actuated ball valve including a traveling nut mechanism, in accordance with various aspects of the present disclosure.

FIG. 6A depicts an assembled isometric cut-away view of a ferromagnetic magnet-actuated ball valve including a traveling nut mechanism, in accordance with various aspects of the present disclosure. Those components in FIG. 6A that have been described previously with reference to FIGS. 1-5B may not be described again for purposes of clarity and brevity.

In various valve types that require more torque to operate, a traveling nut architecture may be used to increase the torque provided by the magnetic actuation mechanism (e.g., the magnetic coupling between external magnets 106a, 106b and internal actuation member 110) described herein. The actuation mechanism of a valve may include a stem 1204 with a helical ridge mated to a traveling nut 1250. As internal actuation member 110 rotates, traveling nut 1250 may move up (or down, depending on the direction of rotation) stem 1204. Upwards and downwards movement of traveling nut 1250 may, in turn, rotate a lever 1252. The lever 1252 may produce an increased torque when rotated relative to rotation of stem 1204 alone. Turning lever 1252 may actuate the valve member between an open and a closed position.

Figure 6B:
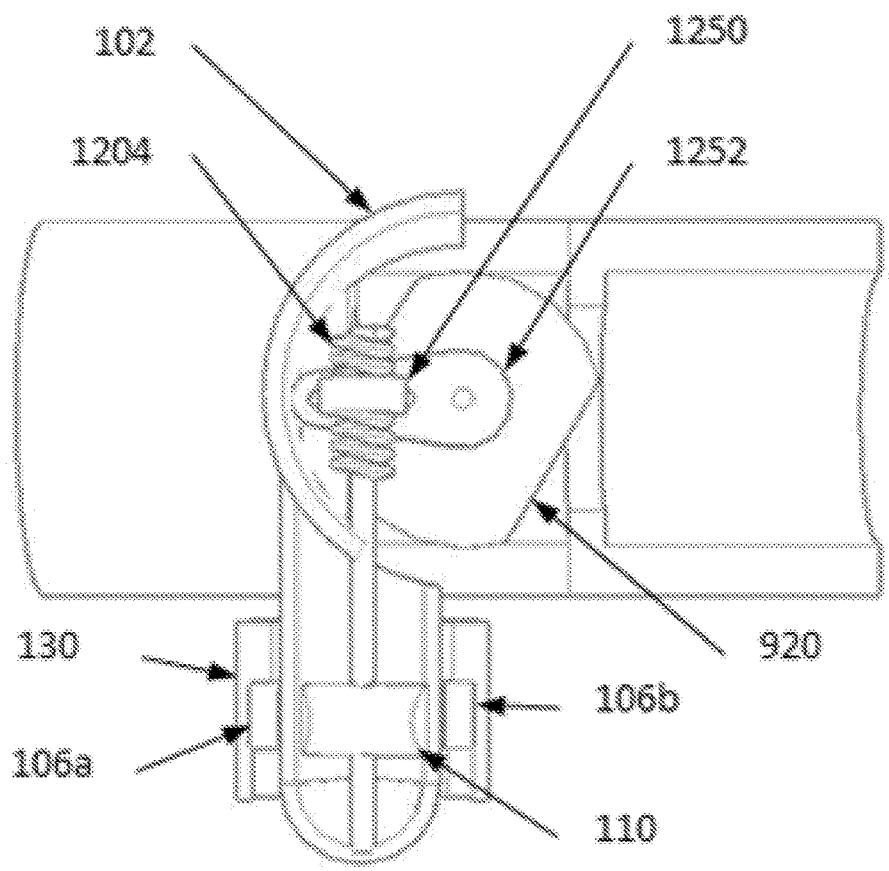
FIG. 6B depicts an assembled top view (along the axis of rotation) of the ferromagnetic magnet-actuated ball valve of FIG. 6A, in accordance with some aspects of the present disclosure.

FIG. 6B depicts an assembled top view (along the axis of rotation) of a ferromagnetic magnet-actuated ball valve that is internally geared down by a traveling nut mechanism. In various examples, higher rotation speeds and lower torque may be used to actuate the magnetic actuator of the valve architecture depicted in FIG. 6B, while the internal traveling nut mechanism may increase the torque to rotate the ball valve member.

Figure 7:
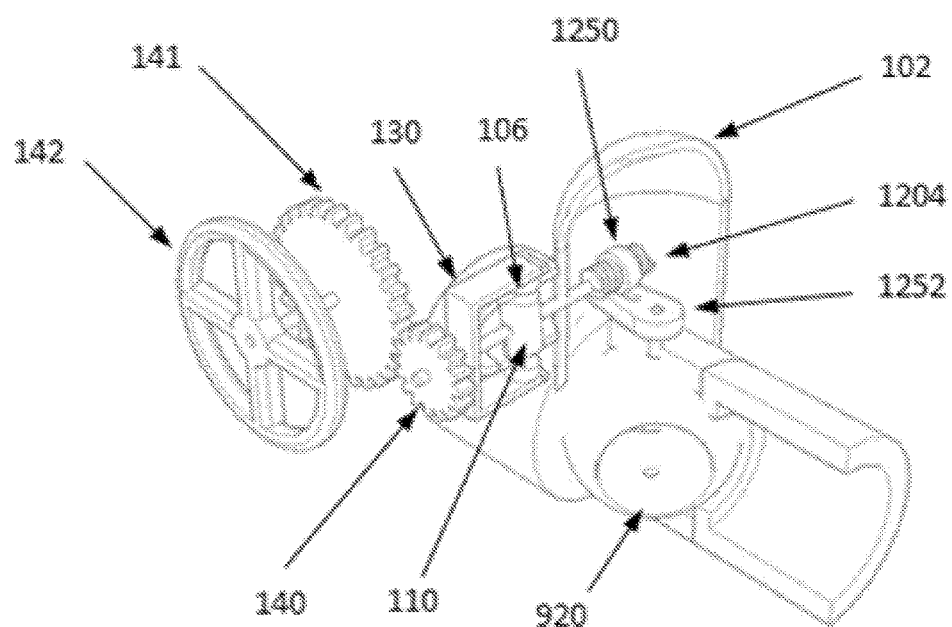
FIG. 7 depicts an assembled isometric cut-away view of a ferromagnetic magnet-actuated ball valve including external and internal gear mechanisms, in accordance with some aspects of the present disclosure.

FIG. 7 depicts an assembled isometric cut-away view of a ferromagnetic magnet-actuated ball valve including external and internal gear mechanisms, in accordance with some aspects of the present disclosure. Those components in FIG. 7 that have been described previously with reference to FIGS. 1-6B may not be described again for purposes of clarity and brevity.

The valve in FIG. 7 comprises external gearing (e.g., gears 140, 141) to increase the rotational speed of the magnetic coupling between external actuator 130 and internal actuation member 110) relative to the rotational speed of actuator 142. Additionally, the valve in FIG. 7 is internally geared down by a traveling nut mechanism to increase the torque used to rotate the ball valve member 920 relative to rotation of stem 1204 along. Turning lever 1252 may actuate the valve member 920 between an open and a closed position.

Figure 8:
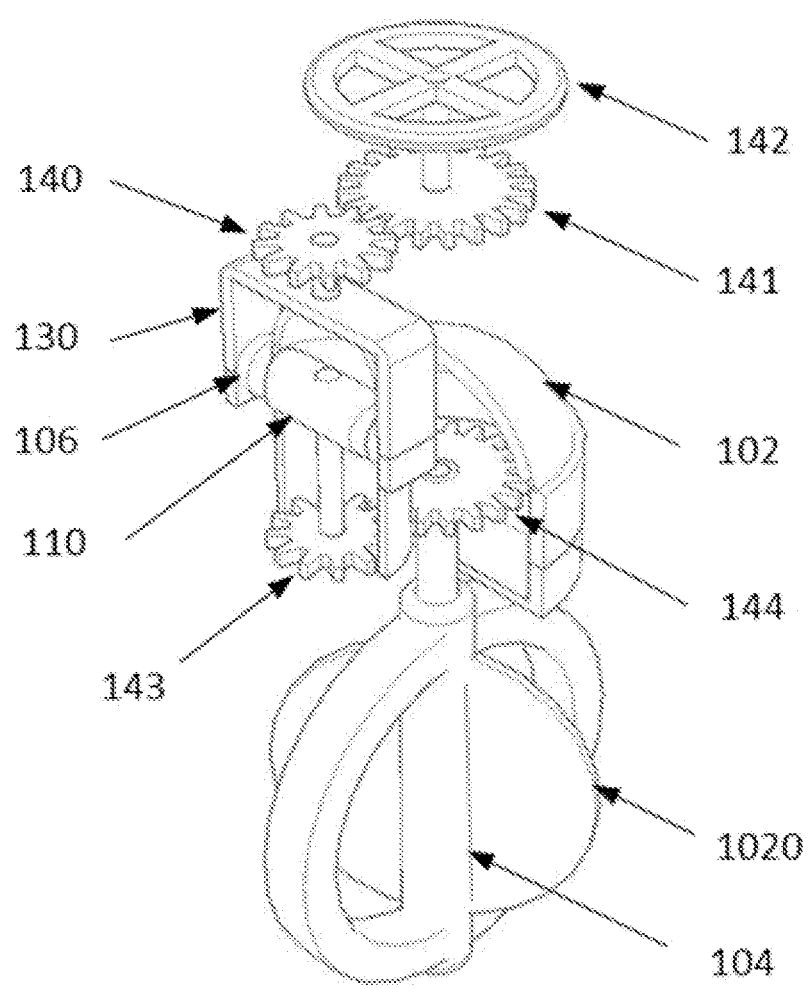
FIG. 8 depicts an assembled isometric cut-away view of a ferromagnetic magnet-actuated butterfly valve including internal and external gear mechanisms, in accordance with some aspects of the present disclosure.

FIG. 8 depicts an assembled isometric cut-away view of a ferromagnetic magnet-actuated butterfly valve including internal and external gear mechanisms, in accordance with some aspects of the present disclosure. Those components in FIG. 8 that have been described previously with reference to FIGS. 1-7 may not be described again for purposes of clarity and brevity.

Rotation of actuator 142 causes rotation of gear 141. Gear 141 interfaces with gear 140 and causes rotation of gear 140 when gear 141 is rotated. Gear 140 is coupled to external actuator 130 including external magnets 106. The external gear mechanism (e.g., gears 140, 141 depicted in FIG. 8) may cause external actuator 130 to rotate at a higher rotational velocity relative to the rotational velocity of actuator 142. Accordingly, the external gear mechanism depicted in FIG. 8 may be used to achieve higher rotation speeds and lower torque than an equivalent valve would exhibit without the external gear mechanism. Inside, rotation of internal actuation member 110 causes gear 143 to rotate which, in turn causes gear 144 to rotate. Gear 144 may be larger (e.g., in diameter) relative to gear 143. Accordingly, gear 144 may rotate at a higher torque and lower rotation speed relative to an equivalent valve where stem 104 was directly attached to internal actuation member 110. However, the internal gear mechanism results in an increased number of rotations of the magnetic actuator for a given amount of valve member 1020 rotation and/or travel.

Figure 9:
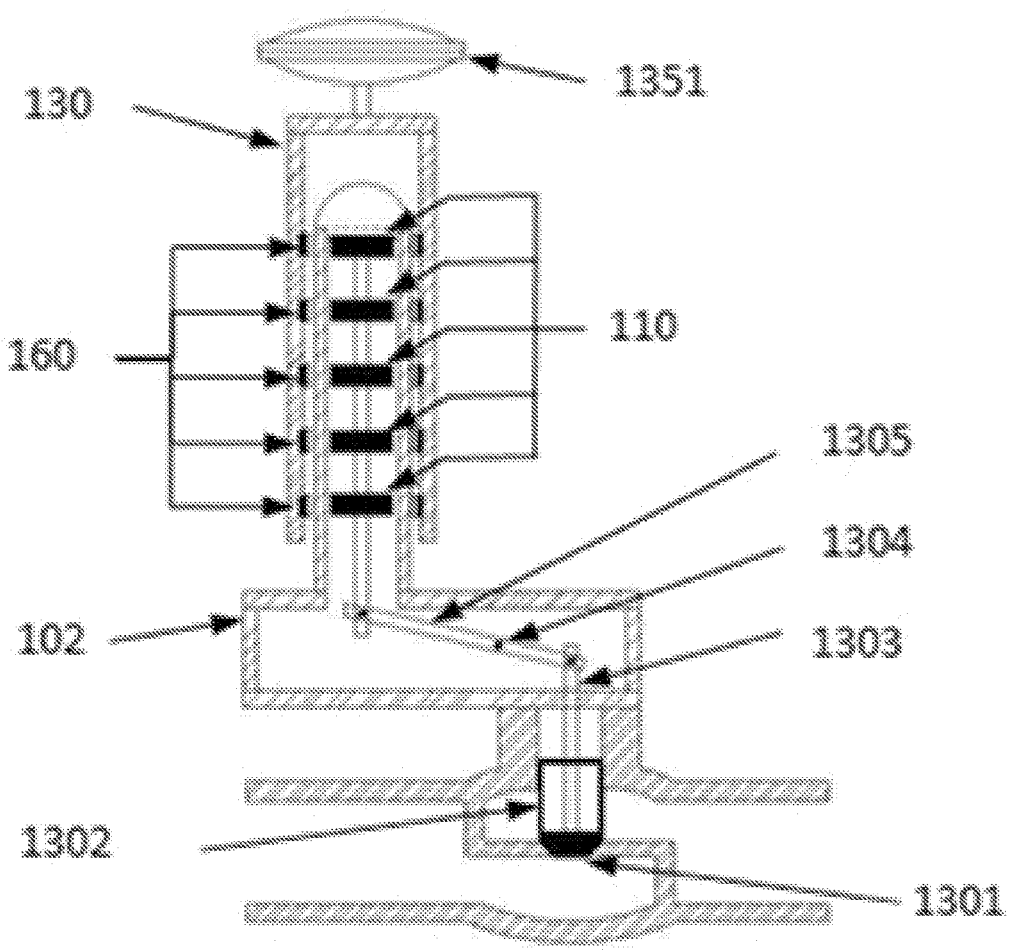
FIG. 9 depicts an assembled side view (perpendicular to the axis of travel) of a ferromagnetic magnet-actuated linear sliding globe valve including an internal lever, in accordance with some aspects of the present disclosure.

FIG. 9 depicts an assembled side view (perpendicular to the axis of travel) of a ferromagnetic magnet-actuated linear sliding globe valve including an internal lever, in accordance with some aspects of the present disclosure. Those components in FIG. 9 that have been described previously with reference to FIGS. 1-8 may not be described again for purposes of clarity and brevity. Lever 1305 may be used to boost the actuation force used to open and close the valve depicted in FIG. 9. Lever 1305 may rotate around fulcrum 1304. Internal actuation member 110 may be effective to move lever 1305. Lever 1305 may be arranged with a mechanical advantage to internal valve stem 1303 and occluding valve member 1301 due to the position of fulcrum 1304. Accordingly, lever 1305 may generate an increased force on occluding valve member 1301. In various examples, a portion 1302 of valve member 1301 may retract into body 102 of the valve assembly when the valve is open.

Figure 10:
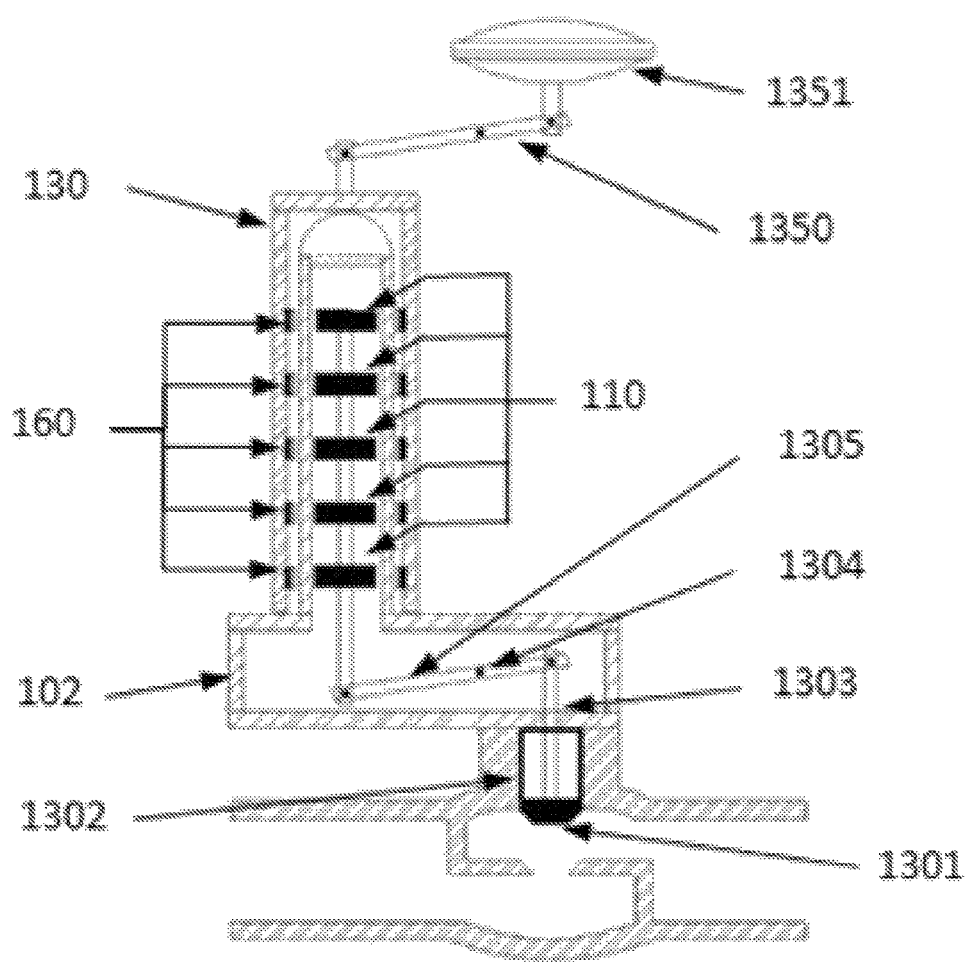
FIG. 10 depicts an assembled side view (perpendicular to the axis of travel) of a ferromagnetic magnet-actuated linear sliding globe valve including internal and external levers, in accordance with various aspects of the present disclosure.

FIG. 10 depicts an assembled side view (perpendicular to the axis of travel) of a ferromagnetic magnet-actuated linear sliding globe valve including internal and external levers, in accordance with various aspects of the present disclosure. Those components in FIG. 10 that have been described previously with reference to FIGS. 1-9 may not be described again for purposes of clarity and brevity. Actuator 1351 moves one side of lever 1350. Lever 1350 may be actuated to push or pull on external actuator 130. Movement of external actuator 130 may exert an upward or downward force on internal actuation members 110 due to the magnetic coupling between external magnets 160 and internal actuation members 110. External magnets 160 may move more quickly but at lower force than would otherwise occur by natural hand motion or standard automated actuator speed, because the fulcrum of lever 1350 is positioned to form an inverse mechanical advantage. This external gear mechanism (including lever 1350) is used to achieve higher travel speeds and lower force than an equivalent valve without the external gear mechanism would exhibit. Inside, internal actuation members 110 may be effective to move lever 1305. Lever 1305 may be arranged with a mechanical advantage to internal valve stem 1303 and occluding member 1301 due to the position of fulcrum 1304. Accordingly, lever 1305 may generate an increased force on occluding valve member 1301.

Various devices and techniques related to magnetically-actuated valves are generally described. In some examples, magnetically-actuated valves may include mechanisms to provide mechanical advantage such that the torques and/or forces applied to the valve member are higher than the torques and/or forces transmitted across the sealed valve enclosure by the magnetic coupling. Some embodiments may also employ devices coupled to the external actuator with typically inverse mechanical advantage (or a speed ratio greater than one) that better match traditional or convenient actuation rates of the valve.

Among other potential benefits, magnetic valves constructed in accordance with embodiments of the present disclosure may alleviate the problem of requiring expensive, bulky and/or very high temperature magnets.

While the invention has been described in terms of particular embodiments and illustrative figures, those of ordinary skill in the art will recognize that the invention is not limited to the embodiments or figures described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A valve assembly, comprising:
a valve body defining an enclosure having a first port and a second port;
a movable valve member positioned in the enclosure between the first port and the second port and configured to control fluid flow from the first port to the second port;
an internal mechanism disposed in the enclosure and operatively coupled to the movable valve member;
an internal actuation member having a ferromagnetic portion comprising an impermanent magnet, the internal actuation member operatively coupled to the internal mechanism; and
an external actuator operatively coupled to an exterior of the valve body, the external actuator comprising:
a first magnetic pole section adjacent to the valve body; and
a second magnetic pole section adjacent to the valve body; and
wherein first movement of the internal actuation member is effective to exert a first force on the internal mechanism, and wherein the internal mechanism is effective to transmit a second force to the movable valve member, wherein the second force is greater than the first force.

2. The valve assembly of claim 1, further comprising:
an external mechanism disposed externally to the valve body and operatively coupled to the external actuator, wherein the external mechanism is effective to receive a third force and to transmit a fourth force to the external actuator, wherein the third force is greater than the fourth force.

3. The valve assembly of claim 2, wherein a first difference between the first force and the second force is equal to a second difference between the third force and the fourth force to within a 20% tolerance.

4. The valve assembly of claim 1, wherein the internal actuation member comprises an elongate member having a first end aligned with the first magnetic pole section and a second end aligned with the second magnetic pole section.

5. The valve assembly of claim 1, wherein the internal mechanism comprises a lead screw.

6. The valve assembly of claim 1, wherein the internal mechanism comprises a first gear of a first diameter and a second gear of a second diameter, wherein the first diameter is smaller than the second diameter.

7. The valve assembly of claim 6, wherein the first gear is operatively coupled to the internal actuation member and wherein the second gear is operatively coupled to the movable valve member.

8. The valve assembly of claim 1, wherein the internal mechanism comprises a worm gear and corresponding worm.

9. The valve assembly of claim 1, wherein the internal mechanism comprises a traveling nut mechanism or a lever.

10. The valve assembly of claim 1, wherein:
the first movement of the internal actuation member comprises a first rotation of the internal actuation member caused by a magnetic coupling of the internal actuation member, the first magnetic pole section, and the second magnetic pole section;
the first force comprises a first torque applied to the internal mechanism causing a second rotation of at least a component of the internal mechanism; and
the second force comprises a second torque applied to the movable valve member caused at least in part by the second rotation of the component of the internal mechanism.

11. A valve assembly, comprising:
a valve body defining an enclosure having a first port and a second port;
a movable valve member positioned in the enclosure between the first port and the second port and configured to control fluid flow from the first port to the second port;
an internal actuation member having a ferromagnetic portion comprising an impermanent magnet;
an external actuator operatively coupled to the internal actuation member and disposed on an exterior of the valve body, the external actuator comprising:
a first magnetic pole section adjacent to the valve body; and
a second magnetic pole section adjacent to the valve body; and
an external mechanism disposed externally to the valve body and operatively coupled to the external actuator, wherein the external mechanism is effective to receive a first force and to transmit a second force to the external actuator, wherein the second force is less than the first force.

12. The valve assembly of claim 11, further comprising:
an internal mechanism disposed in the enclosure and operatively coupled to the internal actuation member and the movable valve member, wherein first movement of the internal actuation member is effective to exert a third force on the internal mechanism, and wherein the internal mechanism is effective to transmit a fourth force to the movable valve member, wherein the fourth force is less than the third force.

13. The valve assembly of claim 12, wherein a first difference between the first force and the second force is equal to a second difference between the third force and the fourth force to within a 20% tolerance.

14. The valve assembly of claim 12, wherein the internal mechanism comprises a worm gear and corresponding worm.

15. The valve assembly of claim 12, wherein the internal mechanism comprises a traveling nut mechanism.

16. The valve assembly of claim 12, wherein the internal mechanism comprises a lead screw.

17. The valve assembly of claim 11, wherein the internal actuation member comprises an elongate member having a first end aligned with the first magnetic pole section and a second end aligned with the second magnetic pole section.

18. The valve assembly of claim 11, wherein the external mechanism comprises a first gear of a first diameter and a second gear of a second diameter, wherein the first diameter is smaller than the second diameter.

19. The valve assembly of claim 18, wherein the first gear is operatively coupled to the external actuator.

20. The valve assembly of claim 11, wherein the external mechanism comprises a lever.

21. The valve assembly of claim 11, wherein at least a portion of the valve body comprises an electrically non-conductive material.

22. A valve assembly, comprising:
a valve body defining an enclosure;
a movable valve member;

an internal actuation member having a ferromagnetic portion comprising an impermanent magnet;

an external actuator operatively coupled to the internal actuation member and disposed on an exterior of the valve body, the external actuator comprising:

a first magnetic pole section adjacent to the valve body; and a second magnetic pole section adjacent to the valve body;

a valve handle disposed externally to the valve body; and an external mechanism disposed externally to the valve body and operatively coupled to the external actuator and the valve handle, wherein when the valve handle is actuated at a first speed, the external mechanism is effective to actuate the external actuator at a second speed that is greater than the first speed.

* * * * *